UNITED STATES PATENT OFFICE.

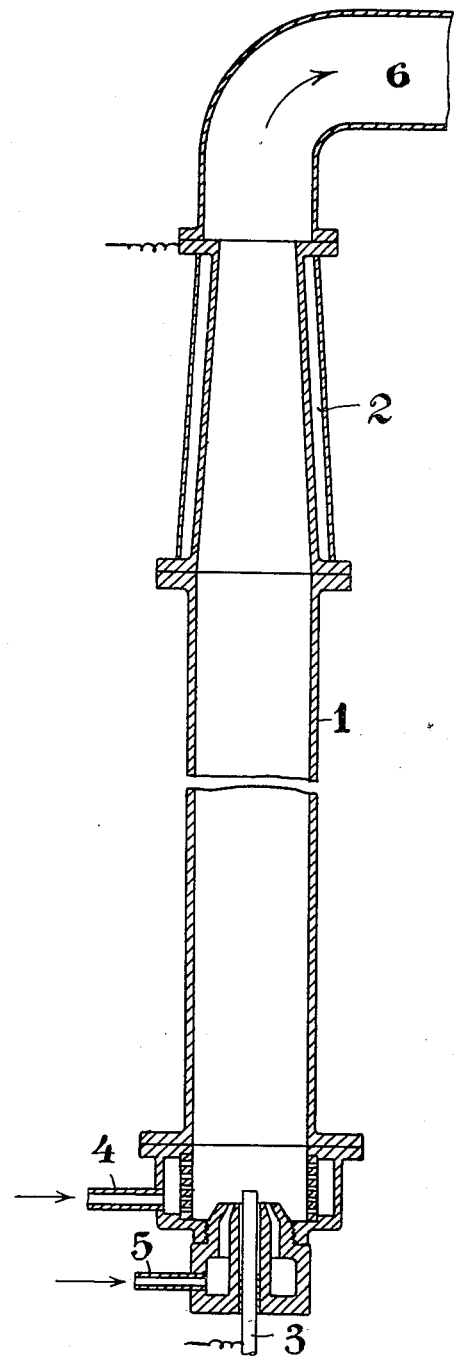

EMIL EDWIN, MAX HÄHNLE, AND BRUNO STRASSER, OF LUDWIGSHAFEN-ON-THE-RHINE, GERMANY, ASSIGNORS TO NORSK HYDRO-ELEKTRISK KVAELSTOFAK-TIESELSKAB, OF CHRISTIANIA, NORWAY.

PROCESS OF CARRYING OUT CHEMICAL REACTIONS IN GASES BY MEANS OF ELECTRIC ARCS.

1,111,301.  Specification of Letters Patent.  Patented Sept. 22, 1914.

Application filed July 3, 1913. Serial No. 777,223.

*To all whom it may concern:*

Be it known that we, EMIL EDWIN, subject of the King of Norway, and MAX HÄHNLE and BRUNO STRASSER, subjects of the Emperor of Germany, all residing at Ludwigshafen-on-the-Rhine, Germany, have invented certain new and useful Improvements in Process of Carrying Out Chemical Reactions in Gases by Means of Electric Arcs; and we do hereby declare the following to be a full, clear, and exact description of the invention, such as will enable others skilled in the art to which it appertains to make and use the same.

It is known, that when chemical reactions are caused to take place in gases by means of electric arcs, only a portion of the gases passing through the furnace enters the actual zone of reaction, while the remaining portion of the gases which is generally considerable passes by without coming into contact with the arc. This latter portion of the gases, however, fulfils the purpose of protecting the walls of the furnace from the heat of the arc and also assists in suddenly cooling the reaction gases which leave the arc, but without taking any part or any considerable part in the reaction. Since therefore only a portion of the large quantities of gases employed is used up in the actual reaction it was generally unprofitable to employ the most advantageous gas-mixture for the reaction and it was preferred to employ less favorable but cheaper gas mixtures. Thus for instance although better yields of oxids of nitrogen are obtained by means of an electric arc from a mixture of air and oxygen than from air without any such addition, yet such mixture could not be used on a partial scale on account of the greater expense. According to the present invention these disadvantages are avoided by feeding a more favorable gas-mixture as far as possible into the actual zone of reaction, and at the same time passing a less favorable, but more readily obtainable gas-mixture through those parts of the furnace where it is less likely to come into contact with the electric arc. In this way it is possible to carry out the reaction using a small quantity of the more expensive reaction gas, while still obtaining as great or nearly as great yield as could be produced if the whole of gases supplied to the furnace consisted of the more advantageous mixture.

The process of the present invention can be very advantageously used in the production of oxids of nitrogen by means of an electric arc, for instance a mixture of nitrogen and oxygen containing, say equal parts of the two gases can be passed direct as far as possible into the actual zone of reaction, while ordinary air is passed along the side of the electric arc. If desired pure oxygen or gases with a high percentage of oxygen can be led into the zone of reaction if by suitable direction of the external air current so much of the latter enters the zone of reaction that a suitable mixture for obtaining a good yield is so produced.

The present process can be carried out with great ease in those cases where use is made of a long stable electric arc burning in the tube. The more advantageous gas-mixture is then led into the interior of the tube, that is to say, directly into or surrounding the electric arc, while the outer layer of air or other less advantageous gas-mixture is preferably introduced with tangential motion and forms a cylindrical covering to the inner core.

The gases taking part in the reaction can be strongly preheated in any desirable manner, while the outer gases may be introduced either cool or only slightly preheated so as as to protect as far as possible the walls of the furnace and to cool down as far as possible the reaction gases when they leave the electric arc.

The accompanying drawing shows a diagrammatic vertical section of an apparatus for carrying out the process.

In said drawing, 1 designates a tube which surrounds the arc and is provided at its upper end with a water jacket 2. The tube constitutes one of the electrodes, the other electrode 3 projects into the tube at the bottom. The less favorable gas mixture is introduced into the tube through a pipe 4, while the more favorable gas mixture is introduced through the pipe 5. The gas outlet 6 is mounted on top of the tube.

We claim.

1. The process of carrying out chemical reactions in gases by means of electric arcs, which consists in maintaining in the actual zone of reaction an atmosphere of a gas mixture in which the components are present in proportions specially favorable for the reaction in question, and maintaining in the space outside of the actual zone of reaction, a gas atmosphere of a less favorable but more readily obtainable composition.

2. The process of carrying out chemical reactions in gases by means of electric arcs, which consists in introducing into the actual zone of reaction a gas which produces a specially favorable atmosphere while passing in the space outside the reaction zone a less favorable but more readily obtainable gas mixture of another composition than the gas in the actual zone of reaction.

3. The process of producing nitrogen oxids by means of electric arcs, which consists in maintaining in the actual zone of reaction an atmosphere rich in oxygen while maintaining in the space outside of the actual zone of reaction an atmosphere principally consisting of atmospheric air.

4. The process of carrying out chemical reactions in gases by means of long stable electric arcs, which consists in introducing gases of a composition specially favorable for the reaction in question in a direction principally parallel to the arc itself while a less favorable gas mixture of another composition is led with a whirling motion in the space surrounding the actual zone of reaction.

In testimony that we claim the foregoing as our invention, we have signed our names in presence of two subscribing witnesses.

EMIL EDWIN.
MAX HÄHNLE.
BRUNO STRASSER.

Witnesses:
 A. REUTLINGER,
 JOSEPH PFEIFFER.